United States Patent [19]

Memmola

[11] Patent Number: 4,683,774
[45] Date of Patent: Aug. 4, 1987

[54] BOWDEN CABLE

[75] Inventor: Serafino Memmola, Varese, Italy

[73] Assignee: Delta Elettronica s.r.l., Varese, Italy

[21] Appl. No.: 699,787

[22] Filed: Feb. 8, 1985

[30] Foreign Application Priority Data

Mar. 8, 1984 [IT] Italy .................. 83609 A/84
Oct. 25, 1984 [IT] Italy .............. 60968/84[U]
Oct. 31, 1984 [IT] Italy .............. 60978/84[U]

[51] Int. Cl.⁴ .............................................. F16C 1/10
[52] U.S. Cl. .................. 74/501 R; 74/501 M
[58] Field of Search ................... 74/501 R, 501 M

[56] References Cited

U.S. PATENT DOCUMENTS

| | | | |
|---|---|---|---|
| 3,143,192 | 8/1964 | Buchanan | 74/501 R X |
| 3,744,339 | 7/1973 | Martinson | 74/501 R |
| 4,503,958 | 3/1985 | Nishio | 74/529 X |
| 4,526,057 | 7/1985 | Mochida | 74/501 B |

Primary Examiner—Harold W. Weakley
Attorney, Agent, or Firm—Peter K. Kontler

[57] ABSTRACT

A bowden cable wherein an intermediate section of the tubular casing is replaced with or an end portion of the casing is constituted by a hollow insert containing a motor for a blocking element which is movable relative to the insert and, when moved to an operative position, prevents an abutment on and hence the wire of the bowden cable from moving axially. The bowden cable is then inoperative, i.e., the wire cannot transmit motion to a lever or to another movable component which holds the hood, the trunk or another mobile part of a motor vehicle in a predetermined (e.g., closed) position.

10 Claims, 12 Drawing Figures

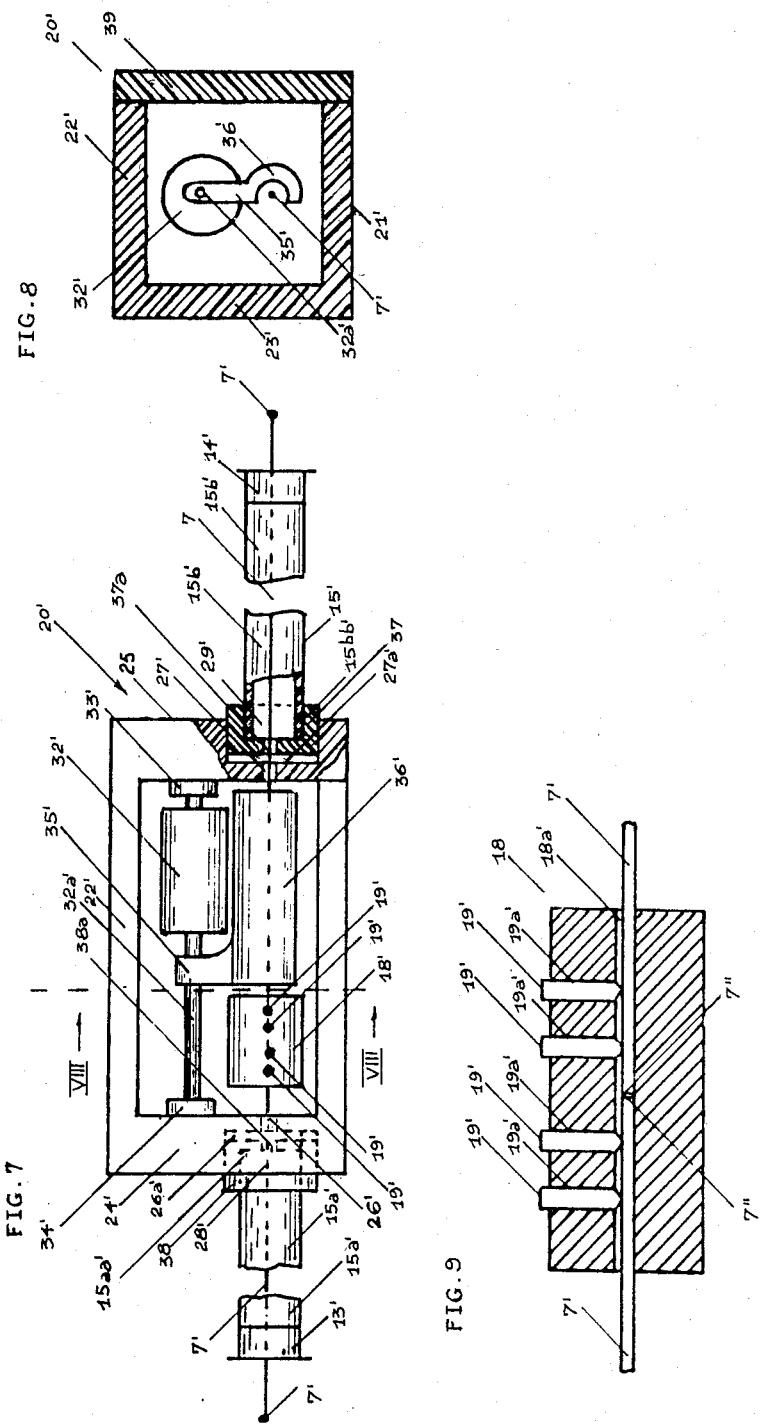

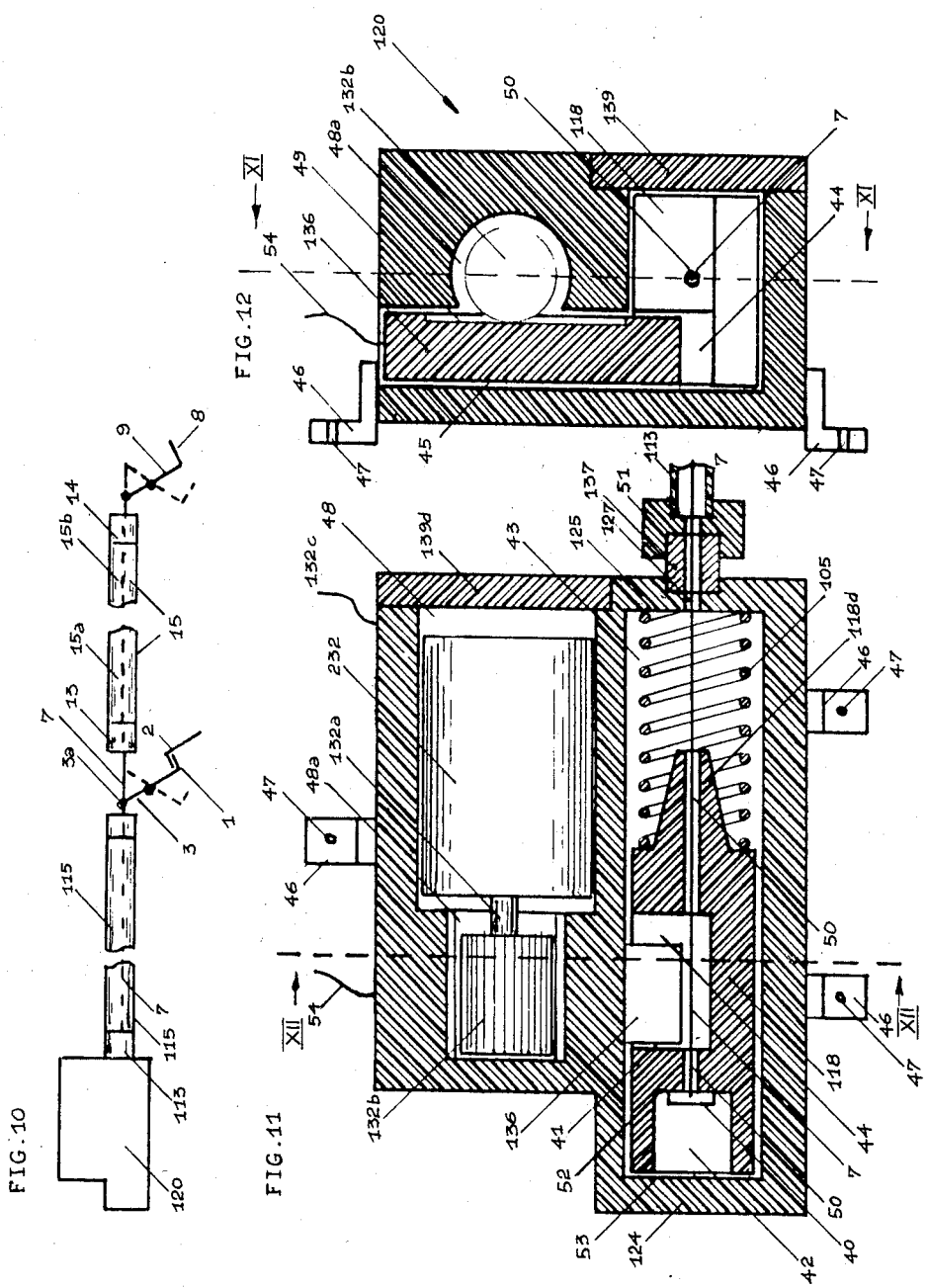

BOWDEN CABLE

BACKGROUND OF THE INVENTION

The present invention relates to bowden cables or wires in general, and more particularly to improvements which enhance the utility and versatility of such motion transmitting devices.

Bowden cables are used in motor vehicles and numerous other machines, appliances and apparatus to transmit motion between spaced-apart components, to transmit longitudinal motion around curves and for many analogous purposes. For example, the device which maintains the hood or trunk of a motor vehicle in closed position can be disengaged by a bowden cable whose wire is accessible at or below the dashboard of the vehicle. Furthermore, depression of a pedal normally or often results in axial movement of the wire of a bowden cable with reference to the tubular casing in order to change the position of the choke in a carburetor or to adjust the injector pump in a diesel engine. If an unauthorized person wishes to gain access to the parts below the hood of a motor vehicle or to the interior of the trunk, the corresponding handle is simply pulled or otherwise actuated so that the bowden cable releases the hood or the trunk cover and enables such unauthorized person to steal parts, to tamper with the engine or with other components below the hood and/or to cause other damage. Attempts to deter thieves and other unauthorized persons from gaining access to certain parts of motor vehicles normally involve the use of specially designed locks or electronic or electrical alarm systems which open the electric circuit or circuits controlling the operation of the vehicle and/or generate acoustic and/or other signals on opening of a door, on lifting of the hood and/or on opening of the trunk. In other words, presently known alarm systems are designed to generate signals after the fact, namely after an unauthorized person has already gained access to the passenger compartment of the vehicle, to the parts below the hood or to the interior of the trunk. Though this need not always involve substantial damage, it nevertheless and often results in destruction of locks for the hood, doors and/or trunk of the vehicle. If an alarm system is designed to open one or more circuits, the parts of such alarm system are normally concealed below the hood so that, once a professional car thief has opened the hood, such person will readily locate and neutralize the parts of the alarm system so that the vehicle can be driven away or its valuable parts can be removed and carried or transported away with impunity.

Presently known bowden cables in motor vehicles and in other types of machines, apparatus or the like are not designed to interfere with convenient access by unauthorized persons to the parts below the hood and/or to the interior of the trunk. On the contrary, such bowden cables are designed to facilitate unlocking of the hood or opening of the trunk with a minimum of effort. The same applies for bowden cables which are used to transmit motion from a pedal to a valve or pump that controls the admission of fuel into a carburetor, engine cylinder or the like.

OBJECTS AND SUMMARY OF THE INVENTION

An object of the invention is to provide a novel and improved bowden cable type motion transmitting device which is constructed and assembled in such a way that it can be caused to effectively and reliably prevent access to or actuation of parts that are controlled thereby whenever the rightful owner or an authorized person so desires.

Another object of the invention is to provide a bowden cable with novel and improved means for preventing axial movements of the wire with reference to the casing for as long and as often as necessary.

A further object of the invention is to provide a bowden cable type motion transmitting device which can be used as an antitheft system or, at the very least, as an effective and reliable accessory to a conventional antitheft system.

An additional object of the invention is to provide a bowden cable which is constructed and assembled in such a way that it not only affords convenient access to or ensures convenient and effortless actuation of parts that are controlled thereby but that it also interferes with such access or with such actuation when the owner or an authorized person so desires.

Still another object of the invention is to provide a bowden cable whose versatility greatly exceeds that of heretofore known bowden cables.

A further object of the invention is to provide a novel and improved method of selectively permitting and preventing the operation of a bowden cable.

Another object of the invention is to provide a novel and improved antitheft system for use in motor vehicles or other machines, apparatus and/or appliances which employ one or more bowden cables.

An additional object of the invention is to provide a novel and improved casing for use in a bowden cable.

A further object of the invention is to provide a novel and improved wire for use in a bowden cable.

Another object of the invention is to provide a bowden cable which exhibits the above outlined features but is not or need not be much more complex, more expensive or bulkier than heretofore known bowden cables.

A further object of the invention is to provide a bowden cable of the above outlined character which can be designed to constitute a highly effective accessory to presently known mechanical, electronic and/or electrical antitheft systems.

One feature of the invention resides in the provision of a method of selectively permitting and preventing the operation of a bowden cable type motion transmitting device wherein a tubular casing with two fixed spaced-apart end portions surrounds an axially movable wire extending through the casing and beyond the two end portions. The method comprises a first step of providing the casing with a fixed abutment which is disposed between its two end portions and does not affect the mechanical integrity of the casing all the way between the two end portions, a second step of providing a portion of the wire with a mobile abutment which is normally movable relative to the fixed abutment when the bowden cable is ready for use, and a third step of moving an obstruction (e.g., a metallic blocking element) with reference to the two abutments to and from an operative position in which the obstruction prevents the mobile abutment from moving relative to the fixed abutment.

The first step can include removing a section of the casing between the two end portions and replacing the removed section with a rigid insert which is immediately adjacent the remaining sections of the casing (i.e., adjacent the sections which flanked the removed section prior to the removing step) and includes or contains the fixed abutment. For example, the insert can constitute a substantially parallelepiped hollow receptacle one wall of which constitutes the fixed abutment.

The first step can further comprise severing the wire and the second step then preferably includes splicing the two parts of the severed wire together by means of the mobile abutment.

Another feature of the invention resides in the provision of a bowden cable type motion transmitting device, particularly for use in motor vehicles. The improved device comprises an elongated tubular casing having fixed first and second end portions, an axially movable wire which extends into the casing and beyond at least one of its two end portions, and locking means mounted in and movable relative to the casing into and from at least indirect motion-preventing engagement with the wire intermediate the two end portions of the casing. Such device preferably further comprises means (e.g., a reversible electric motor and control means therefor) for moving the locking means (e.g., a blocking element made of metal or the like) relative to the wire and relative to the casing.

The casing can include spaced-apart first and second tubular sections which respectively include the first and second end portions and have fixed lengths. Such casing can further include a rigid insert (e.g., in the form of a hollow parallelepiped receptacle) which is disposed between the two tubular sections. The locking means is preferably installed in or on the insert. The two tubular sections include terminal portions which are remote from the respective end portions, and the insert is preferably provided with sockets for the terminal portions of the two tubular sections. The locking means can be arranged to pivot, slide or otherwise move between operative and inoperative positions, i.e., into and from direct or indirect engagement with the wire. In accordance with one presently preferred embodiment of the invention, the insert has two spaced-apart walls which are adjacent to the respective tubular sections and have holes so as to allow the wire to be introduced into and withdrawn from the insert by way of such holes.

A mobile abutment can be provided on the wire between the end portions of the casing (preferably between the end walls of the aforementioned insert) and the casing then includes a second abutment (e.g., one of the end walls of the insert). The mobile abutment is movable by the wire between a first position remote from and a second position nearer to the second abutment, and the locking means preferably includes the aforementioned blocking element which is movable between the two abutments in the first position of the mobile abutment so that the mobile abutment is then held against movement toward its second position i.e., the wire is held against axial movement in at least one direction. The mobile abutment preferably includes a solid metallic or plastic member and means (e.g., screws) for clamping the solid member to the wire. The combined dimensions of the solid member and of the wire portion which is secured thereto are such that the member cannot enter the first or the second tubular section of the casing and is preferably confined to movements between the end walls of the insert (provided that the locking means is inoperative). If the wire has been severed for the purpose of installing the insert between two tubular sections of the casing, the mobile abutment can constitute a coupling which splices or otherwise secures the two parts of the wire to each other.

The device can further comprise an actuator which is connected to the wire outwardly adjacent to one of the first and second end portions of the casing and is operable to move the wire axially when the locking means is inoperative, and a movable component (e.g., a pivotable lever) which is outwardly adjacent to the other end portion of the casing and is connected to the wire in order to receive motion in response to axial movement of the wire.

The just mentioned component can include means for releasably holding the hood of a motor vehicle in closed position or means for releasably locking the trunk of a motor vehicle in closed position. Also, the movable component can form part of a carburetor in a motor vehicle (e.g., by being attached to the choke of the accelerator). Basically, the movable component can include means for normally holding a part of a motor vehicle in a predetermined position and can be disengaged from or moved with such part only when the locking means is inoperative.

The insert can mesh with a cylindrical member which defines one of the aforementioned sockets and which can be rotated relative to the insert to thereby change the distance between the terminal portions of the two sections of the casing.

Manually operated means (e.g., a handle which can pivot or otherwise move the locking means between operative and inoperative positions) can be provided in addition to or as a substitute for a motor which can be used to effect movements of the locking means between such positions. The control means for the motor can include a control circuit constituting, resembling or being controlled by a conventional antitheft control system for use in motor vehicles.

If the wire comprises two discrete parts whose end portions must be spliced together by the mobile abutment, the latter can be provided with a passage for the end portions of the two parts of the wire and with means for preferably releasably clamping the end portions of the two parts of the wire to the mobile abutment. Such clamping means can comprise screws or other threaded elements which mate with the mobile component.

The other end portion of the casing can include or constitute the aforementioned receptacle and one end portion of the wire is then disposed in the interior of the receptacle. The mobile abutment is movable with the one end portion of the wire in the interior of the receptacle, and the blocking element of the locking means is movable in the receptacle to and from the operative position in which it prevents the mobile component and the wire from moving relative to the casing. The mobile component is reciprocable in such receptacle between a first position (in which the wire prevents the unlocking of a hood, trunk or another part of a motor vehicle or prevents the actuation of a valve in the motor vehicle) and a second position (in which the wire unlocks the hood or otherwise permits for actuation or movement of one or more parts in a motor vehicle), and the improved device then preferably further comprises means for yieldably biasing the mobile component to its first position. Such biasing means can comprise a coil spring which reacts against the receptacle and bears against the mobile component so that it must store energy when the mobile component leaves its first position. Stop means (e.g., a disc affixed to the one end portion of the wire) can be provided in the receptacle, and the biasing means is then designed to urge the mobile component against the stop means. The latter can be made integral with or can constitute a portion of the mobile abutment.

The just described motion transmitting device can comprise actuator means (e.g., a lever) attached to the other end portion of the wire and serving to move the wire axially. Such device can further comprise a customary second casing which surrounds the wire between the actuator means and the first mentioned casing and serves to ensure that the wire can be guided along a path which deviates from a straight path (in contrast to the guidance of the bare portion of the wire in the receptacle along a straight path). The end portions of the second casing are fixed (e.g., secured to a motor vehicle) and an intermediate portion of the second casing surrounds the wire between such end portions, i.e., between the actuator means and the first named casing. A lever, link or another motion imparting element can be attached to the wire between the two casings and such element can be used to normally hold the hood or trunk of a motor vehicle in closed position or to maintain a valve in a motor vehicle in the operative position.

The means for moving the blocking element to and from its operative position of direct or indirect engagement with the wire can include a reversible electric motor and a rack and pinion drive which is interposed between the output element of the motor and the blocking element if the latter is designed to reciprocate to and from its operative position. In addition to the aforementioned motor (i.e., in addition to a power-operated means), the improved device can further comprise a flexible element or other suitable means for manually moving the blocking element to one of its positions, preferably to the inoperative position so as to allow for axial movements of the wire if the motor is out of commission or if the means for normally controlling the operation of the motor is damaged or destroyed.

The receptacle can constitute a sturdy metallic or plastic body, e.g., a metallic body having discrete compartments for the motor, for the mobile abutment and for the blocking element. This ensures that the receptacle has several internal partitions which contribute to its stability.

The novel features which are considered as characteristic of the invention are set forth in particular in the appended claims. The improved device itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 7 is an enlarged view of the structure which is shown in FIG. 6, with a portion of the receptacle broken away;

FIG. 8 is a sectional view as seen in the direction of arrows from the line VIII—VIII of FIG. 7;

FIG. 9 is an enlarged central longitudinal sectional view of the mobile abutment in the device of FIGS. 6 to 8;

FIG. 10 is a fragmentary schematic elevational view of a third motion transmitting device wherein the wire extends into two casings and the end portion of one of the casings constitutes a receptacle for the mobile abutment;

FIG. 11 is an enlarged longitudinal sectional view of the receptacle in the device of FIG. 10 as seen in the direction of arrows from the line XI—XI in FIG. 12; and FIG. 12 is a sectional view as seen in the direction of arrows from the line XII—XII in FIG. 11.

DESCRIPTION OF THE PREFERRED EMBODIMENTS

Figure 1:
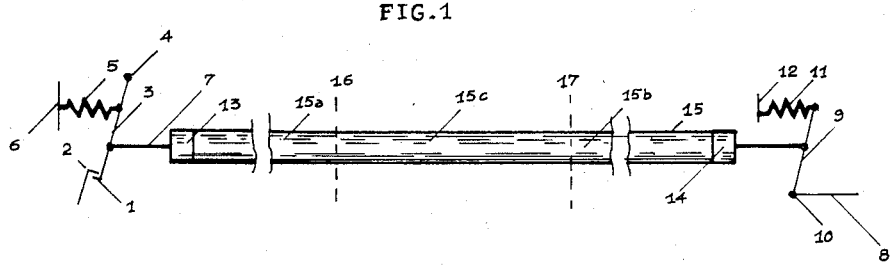
FIG. 1 is a fragmentary schematic elevational view of a bowden cable which is about to be converted into a motion transmitting device embodying one form of the invention.

Referring first to FIG. 1, there is shown a conventional bowden cable or bowden wire including a casing 15 and a wire or cable 7. This bowden cable is designed to establish an operative connection between a hook 1 which constitutes a means for releasably holding a portion 2 of the hood of a motor vehicle in closed and locked position and an actuator 8 (e.g., a handle) which is accessible below the dashboard of the motor vehicle and can be grasped and displaced by hand in order to disengage the hook 1 from the hood portion 2 and allow for movement of the hood to its open position, e.g., under the action of a spring.

The left-hand end portion of the wire 7 is connected to an intermediate portion of a movable component 3 in the form of a one-armed lever which is pivotable in the frame of the motor vehicle at 4 and is biased in a clockwise direction, as viewed in FIG. 1, by a coil spring 5 so as to normally maintain the hook 1 in proper locking and retaining engagement with the hood portion 2. The coil spring 5 is attached to a portion 6 of the motor vehicle frame and its force is sufficient to move the hook 1 into engagement with the hood portion 2 (when the hood is located in the illustrated closed position) as soon as the operator of the vehicle or another authorized person (e.g., a mechanic in a repair shop) ceases to apply torque to the actuator 8.

The right-hand end portion of the wire 7 is attached to the intermediate portion of a lever 9 which is pivotable in the frame of the motor vehicle, as at 10, which is rigidly connected to the actuator 8, and which is biased in a clockwise direction by a coil spring 11 reacting against a portion 12 of the frame below the dashboard. When the operator ceases to turn the actuator 8 in a clockwise direction, as viewed in FIG. 1, in order to pull the wire 7 in a direction to the right and to thereby disengage the hook 1 of the movable component 3 from the portion 2 of the hood against the opposition of the coil spring 5, the spring 11 immediately assists the spring 5 in returning the wire 7 of the bowden cable to the illustrated axial position.

The casing 15 of the bowden cable includes two fixed end portions 13 and 14. The manner in which such end portions are respectively secured to the portions 6, 12 of the frame of the motor vehicle or to other fixed parts of such frame is not specifically shown in FIG. 1. It suffices to say that the casing 15 is held against any axial movement and that the wire 7 must be moved axially relative to the casing in order to release the hood portion 2, and hence the entire hood, for movement to the open position.

In order to convert the bowden cable of FIG. 1 into an improved motion transmitting device which embodies the present invention and wherein the wire 7 can be locked against axial movement relative to the casing 15 whenever the need for such locking arises, one can proceed by severing the casing 15 in the plane 16 and/or 17 (both indicated in FIG. 1 by vertical broken lines). In order to retain the mechanical integrity of the wire 7, the latter is preferably disconnected from the lever 9 or from the movable component 3 and is moved to the left or to the right, as viewed in FIG. 1, so that it is withdrawn from the centrally located intermediate section 15c of the casing 15. When the severing operation is completed, i.e., when the casing 15 has been cut in the planes 16 and 17, the remainder of the casing includes two tubular sections 15a (including the end portion 13) and 15b (including the end portion 14). Of course, one can achieve the same result by severing the casing 15 only in the plane 16 or only in the plane 17 if the original length of the casing 15 prior to severing matches the combined length of the sections 15a and 15b. At least one of the thus obtained sections 15a and 15b is thereupon simply shifted axially and away from the other section to provide between their freshly formed annular terminal portions 15aa and 15bb (FIG. 2) a gap or space whose width equals the width of the space between the lines 16 and 17 in FIG. 1.

When the severing operation (in the plane 16 and/or in the plane 17) is completed, the wire 7 is reinserted and its previously detached end portion is reattached to the lever 9 or to the movable component 3, i.e., the wire 7 then extends through and beyond the end portions 13, 14 of both remaining sections 15a, 15b and a centrally or substantially centrally located bare portion of the wire 7 is fully exposed in the gap between the lines 16 and 17 of FIG. 1. This gap thereupon receives an insert 20 in the form of a rigid and sturdy receptacle which is operatively connected with the annular terminal portions 15aa, 15bb of the sections 15a, 15b of the casing 15 so that the mechanical integrity of the casing is reestablished, at least to the extent that the end portions 13, 14 cannot move nearer to or further away from each other and also that the distance between the terminal portions 15aa, 15bb remains unchanged. The thus obtained casing includes the tubular sections 15a, 15b and the insert 20.

A mobile abutment 18 in the form of a solid metallic or synthetic plastic member is affixed to the wire 7 in the space between the lines 16 and 17 by means of screws 19 or other suitable clamping means so that the abutment 18 is held against movement in the longitudinal direction of the wire.

The insert or receptacle 20 comprises two end walls 24 and 25 which extend transversely of the wire 7 and whose outer sides respectively have sockets 28, 29 for the corresponding annular terminal portions 15aa, 15bb. The end walls 24, 25 are held at a predetermined distance from each other by three additional walls including a bottom wall 21 (as viewed in FIGS. 2 to 4), a top wall 22 and a rear wall 23. The front side (as viewed in FIG. 2) of the insert or receptacle 20 opposite the rear wall 23 is open but can be closed by a detachable cover, not shown. It will be seen that the illustrated insert or receptacle 20 resembles a hollow parallelepiped box with one of its sides missing.

The end walls 24 and 25 of the insert 20 are further formed with parallel elongated open slots 30, 31 whose inner end portions 26, 27 are located centrally of the respective sockets 28, 29 and are large enough to receive the respective portions of the wire 7. It will be seen that the prefabricated insert 20 can be simply slipped onto the wire 7 between the planes 16, 17 and is releasably but reliably secured to the sections 15a, 15b of the severed casing 15 as soon as the terminal portions 15aa, 15bb enter the respective sockets 28, 29 in the outer sides of the end walls 24, 25. The width of the slots 30, 31 and of their inner portions 26, 27 need not appreciably exceed the diameter of the wire 7. In order to detach the insert 20 from the tubular sections 15a and 15b, the terminal portions 15aa and 15bb must be extracted or otherwise expelled from their respective sockets 28, 29 before the insert 20 can be moved in a direction away from the observer of FIG. 2 whereby the open slots 30, 31 move relative to the corresponding portions of the wire 7 until the wire emerges at the front sides of the end walls 24, 25.

Figure 2:
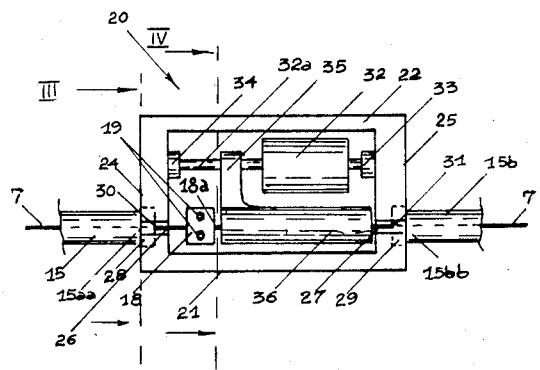
FIG. 2 is a fragmentary elevational view of the converted bowden cable.
Figures 3, 4:
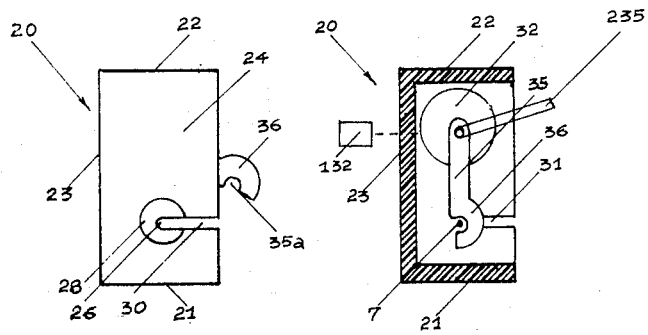
FIG. 3 is a sectional view as seen in the direction of arrows from the line III—III of FIG. 2, with the locking means shown in the inoperative position.
FIG. 4 is a sectional view as seen in the direction of arrows from the line IV—IV of FIG. 2, with the locking means shown in the operative position.

The insert 20 contains a small reversible electric motor 32 forming part of the means for moving a locking means or blocking element 36 to and from an operative position with reference to the mobile abutment 18 on the wire 7 and the end wall 25 (the latter can be said to constitute a fixed abutment of the composite casing including the sections 15a, 15b and the insert 20). The means for moving the blocking element 36 further comprises the output element 32a (e.g., a shaft) of the reversible motor 32 and a lever or arm 35 which is rigid with the output element 32a and carries the blocking element 36. The end portions of the output element 32a can be installed in suitable journal bearings 33 and 34 which are respectively provided at the inner sides of the end walls 25, 24. The motor 32 may be of the type known as FC 150-190, 18A which is manufactured and distributed by the Italian firm Nuova Sama s.p.a. As can be seen in FIGS. 3 and 4, the arm 35 and the blocking element 36 can be provided with a groove 35a which can receive the adjacent portion of the wire 7 with some clearance so as to ensure that the blocking element 36 can enter the space between the abutments 18 and 25 to thus prevent the mobile abutment 18, and hence the entire wire 7, from leaving the (first) position of FIG. 2 which corresponds to the position of the wire 7 in FIG. 1, i.e., from moving to a second position nearer to the abutment or end wall 25 in order to enable the movable component 3 to disengage its hook 1 from the portion 2 of the hood. In other words, when the motor 32 is started to turn the output element 32a and the arm 35 to the positions which are shown in FIGS. 2 and 4, the blocking element 36 is located in the space between the abutments 18, 25 and the actuator 8 cannot be pivoted in a clockwise direction in order to disengage the parts 1 and 2 from each other. When the motor 32 is thereupon started to turn the output element 32a in the opposite direction so that the arm 35 moves the blocking device 36 to the inoperative position of FIG. 3 (this is the normal position of the blocking element 36), the actuator 8 can be manipulated by the owner of the motor vehicle or by another authorized person in order to allow for movement of the hood to its open position.

Figure 5:
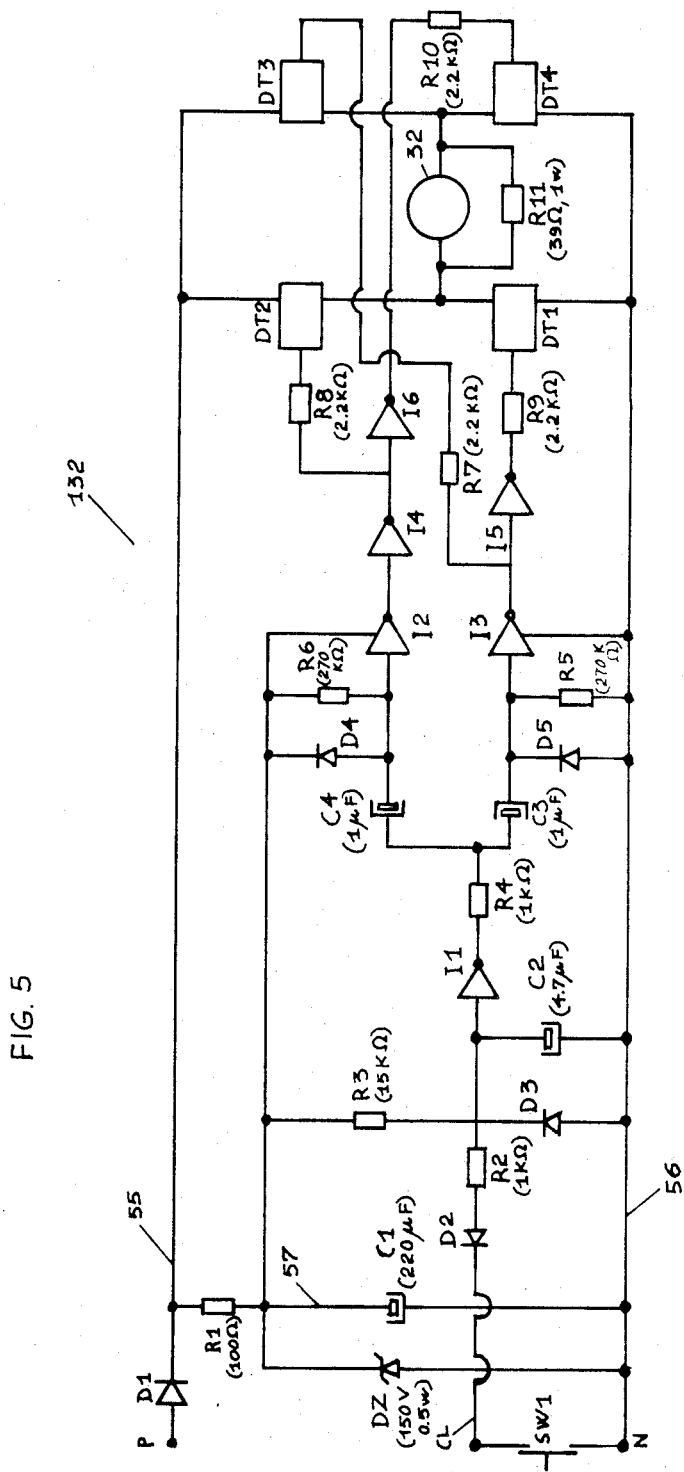
FIG. 5 is a diagram of a control circuit for the motor which serves to move the locking means between operative and inoperative positions.

The control circuit 132 for the motor 32 is shown schematically in FIG. 4 and in greater detail in FIG. 5. This circuit is connected to the poles P and N of a suitable energy source by conductors 55, 56 and includes a master switch SW1. The conductor 55 contains a protective diode D1 of the type 1N5406. A conductor 57 which is connected between the conductors 55, 56 contains a limiting resistor R1 in series with a capacitor (filter electrolytic condenser) C1. The latter is connected in parallel with a stabilizing Zener diode DZ. A control line CL contains a protective diode D2 (e.g., of the type 1N4004), a limiting resistor R2, an inverter I1 (e.g., a CMOS Schmitt trigger MM74C14N) and a limiting resistor R4. A polarizing resistor R3 is connected in series with a protective diode D3 (e.g., of the type 1N4004) and the latter is connected in parallel with a capacitor (filter electrolytic condenser) C2. The circuit 132 further includes additional inverters I2, I3, I4, I5, I6 each of which can be identical with the inverter C1, two R-C links C3-R5 and C4-R6, two quick-discharge diodes D4 and D5 which can be identical with the diode D2, control resistors R7, R8, R9, R10, two NPN-Darlington transistors DT1, DT4 (e.g., of the type TIP 121), two PNP-Darlington transistors DT2, DT3 (e.g., of the type TIP 126), and a further protective resistor R11.

When the master switch SW1 is closed, the control line CL is connected to the negative pole N of the energy source. Thus, the output of the inverter I1 transmits a positive signal to charge the capacitor C3. The transistors DT1 and DT3 are switched on by way of the inverters I5 and I3 to start the reversible motor 32 in a first direction for a preselected interval of time (e.g., for an interval of 350 ms which is determined by the time constant of the R-C link C3-R5). The motor 32 is stopped automatically after elapse of such interval of time.

When the switch SW1 is opened, the input of the inverter I1 receives a positive signal and its output transmits a negative signal to charge the capacitor C4 and the transistors DT2 and DT4 are switched on by way of the inverters I2, I4 so that the motor 32 is started in the opposite direction and is arrested after a preselected interval of time (350 ms). This enables the motor 32 to move the blocking element 36 or 36' (FIG. 6) between the operative and inoperative positions. The switch SW1 can be actuated by an authorized person or indirectly by the actuator of an alarm system.

A key can be used to initiate the movement of the blocking element 36 to the operative position of FIGS. 2 and 4 or to the inoperative position of FIG. 3. In the embodiment which is shown in FIGS. 2, 3 and 4, the motor 32 is designed to turn the output element 32a and the arm 35 clockwise and counterclockwise through angles of approximately 45 degrees. Other angles (e.g., an angle approximating or equaling 90 degrees, 60 degrees or 30 degrees) can be selected if the designer so desires. All that counts is to ensure that the blocking element 36 cannot interfere with axial movements of the wire 7 and mobile abutment 18 when the bowden cable of the present invention is to be operative and that the blocking element 36 can reliably prevent the mobile abutment 18 from moving sufficiently close to the abutment or end wall 25 so as to allow for detachment of the movable component 3 and its hook 1 from the portion 2 of the hood of the motor vehicle. In the operative position of the blocking element 36, the width of the clearance between the side face 18a of the abutment 18 on the wire 7 and the arm 35 (and blocking element 36) is less (preferably much less) than the distance which the wire 7 must cover (by moving axially) in order to disengage the parts 1 and 2 from each other.

The distance between the end walls 24, 25 of the insert 20 (i.e., the length of the insert, as considered in the axial direction of the wire 7) must be sufficient to ensure that the abutment 18 can move toward the end wall or abutment 25 to the extent which is needed to ensure reliable separation of the parts 1 and 2 from each other when the blocking element 36 is held in the inoperative position of FIG. 3.

The motor 32 can be omitted if the designer wishes to provide some means (e.g., a concealed wire attached to the arm 35 and a spring cooperating with such concealed wire) which is manipulated by hand in order to move the blocking element 36 between the operative and inoperative positions. FIG. 4 shows a handle 235 for moving the blocking element 36 between operative and inoperative positions. The provision of power-operated prime mover means (such as the illustrated motor 32) is preferred in many instances because the movements of the blocking element 36 between its operative and inoperative positions can be effected without the exercise of any physical effort and also because the entire system is safer since a key for a special lock is normally required to start the motor 32 in the one or the other direction.

Figure 6:
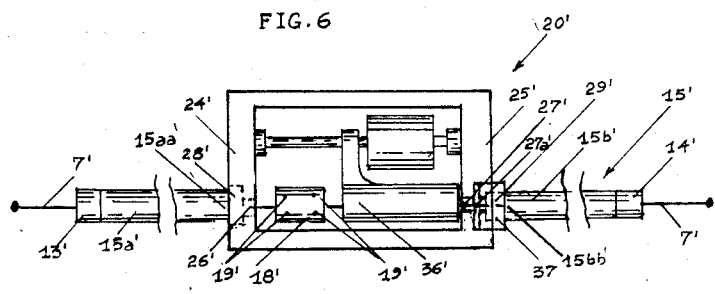
FIG. 6 is a fragmentary elevational view of a modified motion transmitting device.

FIG. 6 shows a portion of a modified motion transmitting device which embodies the invention. Parts which are similar to or identical with the corresponding parts of the device shown in FIGS. 2 to 4 are denoted by the same reference characters each followed by a prime. The device of FIG. 6 can be used with particular advantage under circumstances when the end portions of the wire 7' in an existing conventional bowden cable cannot be separated from the parts (such as the lever 9 and the movable component 3 of FIG. 1) to which they are already affixed. In other words, an intermediate section of the casing 15' cannot be removed (in order to provide room for the hollow insert or receptacle 20') without damaging or temporarily destroying the mechanical integrity of the wire 7'. The bowden cable including the wire 7' and the casing 15' is then severed first in a plane between the planes 16 and 17. The cut is made across the casing 15' as well as across the wire 7'. In the next step, the right-hand portion of the severed wire 7' is retracted in a direction to the right and the left-hand portion of the wire is retracted in a direction to the left, as viewed in FIG. 6, so that the once severed casing 15' can be severed again in the planes 16 and 17 but without severing the wire 7' for the second time. The intermediate sections between the remaining sections 15a', 15b' of the casing 15' are then removed to provide room for the insert or receptacle 20' subsequent to introduction of the severed ends of the wire 7' into the interior of the hollow insert 20' by way of the holes 26', 27' in the end walls 24', 25' and the mechanical integrity of the wire 7' is reestablished by resorting to a modified mobile abutment 18' which constitutes a coupling or splicer between the neighboring end portions of the two parts of the wire 7' and is connected to each of such parts by two or more screws, bolts or other suitable clamping members 19'. The position of the severing plane between the planes 16, 17, the exact position of the mobile abutment 18' relative to the adjacent end wall 24' of the insert 20' and the length of the blocking element 36' in the insert 20' are again selected in such a way that the blocking element 36' prevents the mobile abutment 18' from moving toward the abutment or end wall 25' through a distance which is necessary to enable the wire 7' to effect the disengagement of a movable component (such as the lever 3 and its hook 1) from a part (such as a hood, a trunk, a part of a carburetor or any other lockable part in a motor vehicle or the like) when the blocking element 36' is held in the operative position. The construction of the insert 20' and of the moving means therein can be the same as described in connection with the insert 20 and moving means 32, 32a, 35 of FIGS. 2 to 4.

As can be seen in FIG. 6, the end wall 25' of the insert 20' can be operatively connected with the adjacent annular terminal portion 15bb' of the casing section 15b' in a different way. Thus, the end wall 25' has a tapped bore or hole 27' for an externally threaded cylindrical member 37 which defines the socket 29' for the terminal portion 15bb'. The right-hand portion of the wire 7' is introduced into the insert 20' by way of the hole 27' and the left-hand portion of the wire 7' is introduced into the insert 20' by way of the hole 26' in the end wall 24'. The absence of slots in the end walls 24' and 25' contributes to stability of the insert 20'. The member 37 has a recess for butt connection of the terminal portion 15bb' and a hole 37a for the wire 7'.

The cylindrical member 37 can be rotated relative to the end wall 25' to thereby change the distance between the terminal portions 15aa' and 15bb'. This not only facilitates assembly of the insert 20' with the sections 15a, 15b' but also simplifies the detachment of insert 20' from the remaining parts of the casing 15' and from the wire 7' when the need arises.

FIGS. 7 to 9 illustrate in greater detail the manner in which the hollow insert 20' of FIG. 6 is connected with the annular terminal portions 15aa', 15bb' of the casing sections 15a', 15b' and the manner in which the end portions 7" of the wire or cable 7' can be spliced together in the interior of the insert 20'.

The insert 20' is a rigid parallelepiped receptacle with two end walls 24', 25', a bottom wall 21', a top wall 22' a rear wall 23' and a detachable front wall or cover 39 which is separably secured to the wall 24', 25', 21' and/or 22' so as to afford access to the interior of the insert 20' when necessary. The rigidity of the insert 20' is highly satisfactory because its end walls 24', 25' need not be provided with slots but are merely provided with holes 26', 27' for introduction of the end portions 7" of the wire 7' into an axial passage or bore 18a, of the mobile abutment 18'. The latter can constitute an elongated cylinder consisting of a suitable metallic material and having tapped radially extending bores 19a' for four threaded clamping members 19' in the form of screws. The end portions 7" of the two parts of the wire 7' are caused to abut each other in the axial passage 18a' between the two left-hand and the two right-hand screws 19', as viewed in FIG. 9, while the tips of the screws are withdrawn from the passage. The screws 19' are thereupon tightened so that they reliably hold the end portions 7" of the wire 7' against any movement away from each other, i.e., the integrity of the wire 7" is reestablished and the screws 19' ensure that the mobile abutment 18' is compelled to share all longitudinal movements of the wire 7' relative to the insert 20' and casing 15'.

The reversible motor 32' in the interior of the insert 20' may be of the type FR 150-190, 18 A produced by the Italian firm Nuova Sama, and this motor may be controlled by a circuit which is identical with or analogous to the control circuit 132 of FIG. 5. The motor shaft 32a' is journalled in bearings 33', 34' which are mounted at the inner sides of the end walls 24', 25' and the shaft 32a' is rigidly connected to the adjacent portion or arm 35' of the blocking element 36' which is pivotable about the axis of the shaft 32a' between its operative and inoperative positions in the same way as described in connection with FIGS. 1–4. As shown in FIG. 8, the blocking element 36' can resemble a semicylindrical shell which straddles the adjacent portion of the wire 7' between the end wall 25' (fixed abutment) and the mobile abutment 18'.

The splicing operation is carried out as follows:

In the first step, the casing 15' is severed between the end portions 13' and 14'. The wire 7' is or can be severed at the same time so that it develops the two end portions 7". The wire 7' is thereupon partially extracted from the thus obtained sections 15a' 15b' so that it is not severed again during subsequent shortening of the sections 15a', 15b' by a combined length matching or approximating the length of the insert 20'. The insert 20' is thereupon placed between the shortened sections 15a', 15b' and is secured to the annular terminal portions 15aa', 15bb' in a manner as best shown in FIG. 7. In the next step, the end portions 7" of the wire 7' are introduced into the interior of the insert 20' by first causing them to pass through the centrally located holes in the end walls or bottom walls of the respective externally threaded cylindrical members 37, 38' through the registering holes 26', 27' in the end walls 24' and 25' of the insert 20' and into the corresponding portions of the passage 18a' in the mobile abutment 18' which is then located in the interior of the insert 20' adjacent to the blocking element 36'. At such time, the screws 19' are loose and they are thereupon tightened so as to reliably clamp the end portions 7" to the mobile abutment 18', i.e., the abutment 18' is then compelled to share all axial movements of the wire 7'. The diameters of the holes 37a, 38a in the bottom walls of the cylindrical members 37, 38 and of the holes 26', 27' in the end walls 24', 25' as well as the diameter of the passage 18a' need only slightly exceed the diameter of the bare wire 7'. The cylindrical members 37, 38 are thereupon screwed into the sockets 26a', 27a' in the respective end walls 24', 25' and the cover 39 is attached to the walls 21', 22', 24', 25' to complete the installation of the insert 20' and the splicing of the end portions 7" of the wire 7'.

The structure which is shown in FIGS. 6 to 9 exhibits the advantage that the insert 20' can stand very pronounced deforming stresses because its end walls 24', 25' need not be weakened by the provision of slots therein. Moreover, the end portions 7" of the wire 7' can be spliced to each other in a simple and time-saving operation. The mobile abutment 18' is accessible for inspection and detachment from the end portions 7" of the wire 7', if such inspection and/or detachment is necessary, by the simple expedient of detaching the cover 39 from the adjacent walls of the insert 20'. This also affords access to the reversible motor 32' and to the blocking element 36'.

As explained above, the structure of FIGS. 6 to 9 will be utilized when the insert 20' is to be installed in an existing bowden cable, i.e., when it is necessary to sever the wire 7' and shorten the casing 15' while the outer end portions of the wire remain attached to the corresponding parts of the bowden cable, such as the levers 3 and 9 of FIG. 1.

FIGS. 10 to 12 illustrate a modified motion transmitting device which is used in conjunction with a conventional bowden wire motion transmitting device of the type shown in FIG. 1. The right-hand portion of FIG. 10 shows that the conventional motion transmitting device comprises an elongated casing 15 with fixedly mounted end portions 13, 14 and a wire or cable 7 which extends through the casing 15 (having integral sections 15a, 15b) and whose end portions are connected to levers 3 and 9. The lever 3 carries a hook 1 which is separably connected with a portion 2 of the hood or trunk in a motor vehicle, and the lever 9 is provided with an actuator 8 by means of which the wire 7 can be moved axially to disengage the hook 1 of the lever 3 from the portion 2. The springs 5 and 11 of FIG. 1 may but need not be omitted; they are omitted in the embodiment of FIGS. 10–12 because a hollow receptacle or insert 120 of the improved motion transmitting device contains a coil spring 105 which performs the functions of the springs 5 and 11 shown in FIG. 1. The wire 7 extends beyond the lever 3 (to which it is connected, as at 3a) and its left-hand end portion is affixed to a stop in the form of a disc 40 which is disposed in a recess 42 machined into or otherwise formed in the left-hand end face (as viewed in FIG. 11) of a mobile abutment 118 reciprocable in an elongated chamber or compartment 43 in the interior of the receptacle 120. The latter can be said to constitute a separable end portion of the casing 115.

FIGS. 10 to 12 show the cable or wire 7 in an axial position in which the portion 2 of the hood or trunk of the motor vehicle is engaged and held by the hook 1 of the lever 3. The coil spring 105 is free to bias the mobile abutment 118 to and to maintain this abutment in the left-hand end position of FIG. 11 in which a cutout or recess 44 of the mobile abutment receives the lower end portion of a blocking element 136. The latter includes a toothed rack which is slidable in a second compartment or chamber 45 of the receptacle 120 between the illustrated operative position and an inoperative position in which its lower portion is located at a level above the recess 44 so that the mobile abutment 118 can move under or against the action of the coil spring 105. When the mobile abutment 118 is moved against the opposition of the spring 105 (under the action of the actuator 8) subsequent to movement of the blocking element 136 to its inoperative position, the levers 3 and 9 assume the broken-line positions of FIG. 10; at such time, the hook 1 is disengaged from the portion 2 of the hood or trunk and the latter can be lifted by the authorized person or by a spring which tends to move the hood or trunk to a raised position as soon as the hook 1 is disengaged from the portion 2.

The receptacle 120 is affixed to the chassis of the motor vehicle by brackets 46 which have holes 47 for screws or other suitable fasteners (not shown). A third chamber or compartment 48 in the receptacle 120 receives a reversible electric motor 232 whose output element 132a carries a gear 132b in mesh with the toothed rack of the blocking element 136. The gear 132b is disposed in a smaller-diameter extension 48a of the chamber 48 which communicates with the chamber 45 for the blocking element 136. The conductor means for connecting the motor 232 with a control circuit (such as the circuit 132 of FIG. 5) is shown at 132c. The teeth of the rack on the blocking element 136 are shown schematically at 49. The chamber 43 is substantially parallel to the chamber 48, and the chamber 45 extends transversely of and communicates with the chambers 43, 48. The surfaces which surround the recess 45 ensure that the blocking element 136 is confined to reciprocatory movements between its operative and inoperative positions, i.e., and in contrast to the pivotable blocking elements 36 and 36', the blocking element 136 is slidable in the insert 120 under the action of the reversible motor 232 which can drive the gear 132b clockwise or counterclockwise. As can be seen in FIGS. 11 and 12, the blocking element 136 can constitute a parallelepiped and its upper portion can extend from the receptacle 120 when the mobile abutment 118 is free to reciprocate in its chamber 43. The illustrated abutment 118 has a rectangular cross-sectional outline so that it cannot rotate in the chamber 43 (which is bounded by two pairs of longitudinally extending parallel surfaces). An eccentrically disposed longitudinally extending passage or bore 50 of the mobile abutment 118 is interrupted in the region of the recess 44 and provides a path for the corresponding portion of the bare wire 7. The latter extends from the insert 120 through a hole 127 in the end wall 125 and through the axial bore of a cylindrical member 137 which serves to couple the adjacent end portion 113 of the tubular part of the casing 115 with the receptacle 120. The coupling means further comprises a sleeve 51 which has an axial passage for the wire 7 and is provided with two sockets, one for the end portion 113 and the other for a portion of the cylindrical member 137. The left-hand portion of the cylindrical member 137 (as viewed in FIG. 11) extends into a tapped blind bore which is provided therefor in the end wall 125. The end wall 125 has a removable portion 139d which affords access to the motor 232. The cover 139 can be removed to afford access to the chamber 43 for the coil spring 105 and mobile abutment 118. An end portion of the casing 115 is fixedly secured to the motor vehicle.

The conical or frustoconical tip 118d of the mobile abutment 118 may but need not necessarily move into actual contact with the fixed abutment (end wall 125) when the actuator 8 is caused to move the levers 3 and 9 to their broken-line positions in the inoperative position of the blocking element 136. When the levers 3 and 9 are held in the solid-line positions of FIG. 10, the coil spring 105 ensures that the bottom surface 52 in the recess 42 of the mobile abutment 118 bears against the disc 40 but the left-hand end face of the mobile abutment 118 (as viewed in FIG. 11) may but need not contact the internal surface 53 of the end wall 124. At such time, the left-hand surface in the recess 44 and the adjacent side of the blocking element 136 define a relatively narrow gap or clearance 41 which ensures that the blocking element 136 can readily slide between its operative and inoperative positions. The tip 118d of the mobile abutment 118 serves as a retainer for and as a means for centering the coil spring 105 in the corresponding portion of the chamber 43. The spring 105 reacts against the inner side of the end wall 125.

When the blocking element 136 is caused to assume the operative position of FIGS. 11 and 12, the wire 7 cannot be moved axially by the actuator 8 and/or by a person attempting to pivot the lever 3 and/or 9 to the broken-line position. Longitudinal shifting of the wire 7 is possible only after the motor 232 is caused to move the blocking element 136 to its inoperative position. The manner in which the motor 232 can be controlled by the circuit 132 or an equivalent circuit is or can be the same as described in connection with the motor of FIGS. 2 and 4.

In the embodiment of FIGS. 10–12, the mobile abutment 118 is movable with the wire 7 relative to the fixed abutment 124 and/or 125 only when the blocking element 136 assumes its inoperative position, the same as described in connection with the embodiments of FIGS. 1–5 and 6–9. The main difference between the embodiment of FIGS. 10–12 and the other two embodiments is that the mobile abutment 118 is or can be disposed at one end of the wire 7 whereas the mobile abutments 18 and 18' are spaced apart from the ends of the respective wires. Furthermore, the wire 7 which is shown in FIGS. 10 to 12 need not extend outwardly beyond the left-hand side of the receptacle 120, as viewed in FIG. 11, in contrast to the wires which are shown in FIGS. 1 and 6. Still further, the blocking element 136 can extend not only into the path of but actually into (the recess 44 of) the mobile abutment 118.

The element 54 performs the function to enable an authorized person to manually move the blocking element 136 to the inoperative position if the motor 232 is disabled or the control circuit for the motor 232 is out of commission. As can be seen in the upper portion of FIG. 12, the improved device can comprise a concealed discrete flexible (or rigid) element 54 which can be grasped by hand or by a tool in order to lift the blocking element 136 to the inoperative position. The device 54 extends from the receptacle 120 through the opening for the upper portion of the blocking element 136, and its lower end portion is firmly anchored in the blocking element.

The decision whether the blocking element is to be pivoted or reciprocated between its operative and inoperative positions will depend on the availability of space in the receptacle or insert. The same applies for the selection of the exact manner in which the blocking element is to prevent axial movements of the wire, i.e., the blocking element can extend merely into the path of movement of the mobile abutment with reference to the mobile abutment or it can positively lock (e.g., enter a recess of) the mobile abutment when it assumes its operative position. An advantage of the embodiment (shown in FIGS. 10–12) in which the blocking element positively engages the mobile abutment is that the wire is reliably held against axial movement in either direction (especially if a portion of the wire is rigidly affixed to the mobile component) which even further reduces the possibility of tampering with the improved device.

The tubular section or sections of the casing or casings are needed when the wire must extend along a path that is not straight, e.g., when the wire in the casing 15 or in the tubular part of the casing 115 of FIGS. 10–12 must be guided along one or more corners. The bare portion of the wire in the interior of the receptacle extends along a straight path.

The blocking element 36 or 36' and the mobile abutment 18 or 18' of FIGS. 1–5 or FIGS. 6–9 can be replaced with a blocking element and with a mobile abutment which ensure that, when the blocking element assumes its operative position, the wire 7 or 7' is held against movement in either direction, i.e., the blocking element can positively hold the mobile element against movement with the wire in either direction the same as shown in FIGS. 10 to 12. For this purpose, a portion of the blocking element can extend into one or more recesses of the mobile abutment as shown in FIGS. 10–12 or a portion of the mobile abutment can extend into one or more recesses of the blocking element.

Severing of the casing for the purpose of installing the insert or receptacle is normally needed only when the wire and the casing are already installed in a motor vehicle or the like. When the improved device is assembled in a plant, the insert is united with the tubular section or sections prior to insertion of the wire so that it is not necessary to sever a casing having a length greater than the combined length of the sections 15a, 15b or 15a', 15b' and/or to sever the wire for the sole purpose of installing an insert between two tubular sections of the casing.

The control circuit 132 or an analogous control circuit for the motor 32, 32' or 232 can form part of or can constitute or can be controlled by the control circuit of a conventional antitheft system for motor vehicles or the like. Thus, the key which is used to actuate or deactivate a conventional alarm system can be used to effect a movement of the blocking element to its operative or inoperative position. This further reduces the cost of the improved device. However, and as already mentioned above, it is equally possible (e.g., in order to reduce the cost of the improved device to a minimum) to provide manually operable means 235 or 54 for moving the blocking element between the operative and inoperative positions. For example, the blocking element can be provided with a lug, an arm or a similar extension which can be engaged by fingers to move the blocking element relative to the wire and casing or casings.

As mentioned above, the improved device can be used with advantage in motor vehicles as a simple but highly effective antitheft system by preventing access to the parts under the hood, by preventing access to the trunk, by preventing actuation of the choke in the carburetor and/or by preventing any other operations which are normally effected with resort to a bowden cable. It is further clear that the improved device can be used with equal or similar advantage in conveyances other than motor vehicles as well as in many types of appliances, apparatus and systems where it is desirable and advantageous to employ one or more bowden cables and means for preventing at certain times and during certain intervals the transmission of motion by way of the wire which forms part of the bowden cable.

It is also clear that, if a motor vehicle employs several bowden cables, a single control circuit 132 can be provided to simultaneously move two or more blocking elements to operative or inoperative positions. For example, if a motor vehicle employs a first bowden cable to open the hood from a location below the dashboard, a second bowden cable to open the trunk from a location below the dashboard or from another location, and a third bowden cable to transmit motion to the choke in the carburetor, a single control circuit can be employed to effect movements of three blocking elements between operative and inoperative positions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A motion transmitting device, particularly for use in motor vehicles, comprising an elongated tubular casing having fixed first and second end portions, said casing including spaced apart first and second tubular sections having fixed lengths and respectively including said first and second end portions, and a rigid insert between said sections, said sections including terminal portions remote from the respective end portions and said insert having sockets for the terminal portions of said sections; an axially movable wire extending into said casing and beyond at least one of said fixed end portions; locking means disposed in said insert and being pivotable therein relative to said casing into and from at least indirect engagement with said wire to hold the wire against axial movement relative to the casing; and means for moving said locking means relative to said casing, said moving means including motor means and control means for said motor means.

2. The device of claim 1, wherein said insert has spaced-apart first and second end walls adjacent to the respective tubular sections and open slots in said end walls so as to allow the wire portion between said sections to enter and leave said insert by way of said open slots.

3. The device of claim 2, further comprising a mobile abutment on said wire, said casing including a second abutment and said mobile abutment being movable by said wire between a first position remote from and a second position nearer to said second abutment, said locking means including a blocking element movable relative to said abutments in the first position of said mobile abutment to hold the latter against movement toward said second position, said wire comprising two discrete parts and said mobile abutment including a coupling which separably connects said parts of the wire to one another.

4. The device of claim 1, further comprising an actuator connected to said wire outwardly adjacent said casing and operable to move the wire axially when said locking means is disengage from said wire, and a movable component outwardly adjacent said casing and connected with said wire to receive motion in response to axial movement of said wire, said component including means for releasably holding the hood of a motor vehicle in closed position.

5. The device of claim 1, further comprising an actuator connected to said wire outwardly adjacent said casing and operable to move the wire axially when said locking means is disengaged from said wire, and a movable component outwardly adjacent said casing and connected with said wire to receive motion in response to axial movement of said wire, said component including means for releasably holding the trunk of a motor vehicle in closed position.

6. The device of claim 1, wherein the terminal portions of said sections are annular terminal portions and at least one of said sockets has external threads mating with complementary threads of said insert so that the distance between said terminal portions can be varied by rotating said one socket with reference to said insert.

7. The device of claim 1, wherein said wire is arranged to normally maintain a movable part of a motor vehicle in locked or closed position and said control means includes an antitheft control circuit for use in motor vehicles.

8. The device of claim 1, further comprising a mobile abutment on said wire intermediate said end portions, said casing including a second abutment and said mobile abutment being movable between a first position remote from and a second position nearer to said second abutment, said locking means comprising a blocking element movable relative to said abutments in the first position of said mobile abutment to hold the latter against movement to said second position, said wire comprising two discrete parts with end portions adjacent to each other, said mobile abutment having a passage for the end portions of said parts of the wire and means for clamping the end portions of said parts of the wire to said mobile component.

9. The device of claim 8, wherein said clamping means comprises threaded elements mating with said mobile component.

10. A motion transmitting device, particularly for use in motor vehicles, comprising an elongated tubular first casing having fixed first and second end portions; an axially movable wire extending into said casing and beyond at least one of said fixed end portions, the other of said fixed end portions including a receptacle and said wire having a first end portion in said receptacle and a second end portion; a mobile abutment reciprocable in said receptacle with the first end portion of said wire between first and second positions; means for yieldably biasing said mobile abutment to said first position, said biasing means comprising a coil spring; stop means provided on said first end portion of said wire, said spring being arranged to urge said mobile abutment against said stop means; locking means slidable in said casing into and from at least in direct engagement with said wire to hold the wire against axial movement relative to the casing, said locking means including a blocking element reciprocable between an inoperative position and an operative positive in which it prevents said mobile abutment and said wire from moving relative to said casing; actuator means for moving said wire axially, said actuator means being connected to the second end portion of said wire; a second casing having fixed end portions and an intermediate portion surrounding said wire between said actuator means and said first casing; means for reciprocating said blocking element relative to said first casing, said reciprocating means comprising a toothed rack on said blocking element, a reversible motor, a gear driven by said motor and mating with said rack, and control means for said motor, said receptacle having a first chamber for said mobile abutment, a second chamber for said reciprocating means and a third chamber for said blocking element; and manually operable means for moving said blocking element to one of its positions, said manually operable means including a flexible element.

* * * * *